United States Patent
Musick et al.

(10) Patent No.: US 10,948,122 B2
(45) Date of Patent: Mar. 16, 2021

(54) SYSTEMS FOR AND METHODS OF DIFFERENTIATING PIPE INSULATION

(71) Applicant: Owens Corning Intellectual Capital, LLC, Toledo, OH (US)

(72) Inventors: David Eugene Musick, Heath, OH (US); Neil Robert Hettler, Granville, OH (US); Timothy R. Clancy, Swanton, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 0 days.

(21) Appl. No.: 16/336,144

(22) PCT Filed: Sep. 22, 2017

(86) PCT No.: PCT/US2017/052841
§ 371 (c)(1),
(2) Date: Mar. 25, 2019

(87) PCT Pub. No.: WO2018/063925
PCT Pub. Date: Apr. 5, 2018

(65) Prior Publication Data
US 2019/0285222 A1     Sep. 19, 2019

Related U.S. Application Data

(60) Provisional application No. 62/400,328, filed on Sep. 27, 2016.

(51) Int. Cl.
*F16L 59/14*     (2006.01)
*F16L 55/033*    (2006.01)
*F16L 59/02*     (2006.01)

(52) U.S. Cl.
CPC .............. *F16L 59/14* (2013.01); *F16L 55/033* (2013.01); *F16L 59/022* (2013.01); *F16L 2201/60* (2013.01)

(58) Field of Classification Search
CPC ..... F16L 2201/60; F16L 59/00; F16L 59/143; F16L 59/022
USPC ................................ 138/104, 149, 128, 156
See application file for complete search history.

(56) References Cited

U.S. PATENT DOCUMENTS

| | | |
|---|---|---|
| 373,822 A | 11/1887 | Fry |
| 626,249 A | 6/1899 | Seyd |
| 1,738,378 A | 12/1929 | Little |
| 2,001,054 A | 5/1935 | Lawrence |
| 2,449,265 A | 9/1948 | Williams |

(Continued)

FOREIGN PATENT DOCUMENTS

| | | | | |
|---|---|---|---|---|
| EP | 1262701 A1 | * | 12/2002 | ............... F16L 9/00 |
| GB | 2520178 A | * | 5/2015 | ............ F16L 59/022 |

OTHER PUBLICATIONS

International Search Report and Written Opinion from PCT/US2017/052841 dated Dec. 15, 2017.

(Continued)

*Primary Examiner* — Patrick F Brinson
(74) *Attorney, Agent, or Firm* — Calfee, Halter & Griswold LLP

(57) ABSTRACT

Pipe insulation includes indicia thereon to facilitate differentiating the pipe insulation from other pipe insulation, even when a majority of the pipe insulation is not visible to a user.

13 Claims, 8 Drawing Sheets

(56) References Cited

U.S. PATENT DOCUMENTS

| | | | |
|---|---|---|---|
| 3,563,503 A * | 2/1971 | Lancaster | F16L 59/024 |
| | | | 248/49 |
| 3,718,999 A | 3/1973 | Voyce | |
| 3,941,159 A | 3/1976 | Toll | |
| 3,992,794 A | 11/1976 | Lazarus | |
| 4,060,100 A | 11/1977 | Miller et al. | |
| 4,471,547 A | 9/1984 | Koslow | |
| 4,772,507 A | 9/1988 | Leo, Jr. et al. | |
| 4,778,700 A | 10/1988 | Pereira | |
| 5,010,667 A | 4/1991 | Hassinger | |
| 5,489,126 A | 2/1996 | Gray, Jr. | |
| 5,941,287 A | 8/1999 | Terito et al. | |
| 6,183,016 B1 | 2/2001 | Parker | |
| 6,460,576 B2 | 10/2002 | Vitoorapakom | |
| 6,752,176 B1 | 6/2004 | Price et al. | |
| 6,843,279 B1 | 1/2005 | Ungemah | |
| 7,527,302 B2 | 5/2009 | Lewis et al. | |
| 7,988,204 B2 | 8/2011 | Lewis et al. | |
| 8,141,594 B2 | 3/2012 | Shumate et al. | |
| 8,443,845 B2 | 5/2013 | Tomlin et al. | |
| 2006/0006252 A1 | 1/2006 | Wilson | |
| 2007/0017590 A1 | 1/2007 | Tigerfeldt | |
| 2007/0264300 A1 | 11/2007 | Seifert et al. | |
| 2008/0097406 A1 | 4/2008 | Freed | |
| 2008/0141574 A1 | 6/2008 | Jones | |
| 2008/0148688 A1 | 6/2008 | Uitenbroek | |
| 2009/0026755 A1 | 1/2009 | Schmidt | |
| 2010/0229436 A1 | 9/2010 | Zeyfang | |
| 2011/0041919 A1 | 2/2011 | Turner | |
| 2011/0139289 A1 | 6/2011 | Qi | |
| 2014/0083547 A1 | 3/2014 | Hwang | |
| 2015/0129073 A1 | 5/2015 | Quagliani | |

OTHER PUBLICATIONS

"Radial Markings," Dapra Marking Systems, Sep. 2, 2016 [online], retrieved Nov. 16, 2017 from <URL: https://web.archive.org/web/20160902070801/https:/www.dapramarking.com/contract-marking.htm#top>, 3 pages.

"Color Coded Pipe Ends Image," PLS Logistics, retrieved Jul. 5, 2016 from <URL: http://www.plslogistics.com/energy/color-coded-pipe-ends-2/>, 2 pages.

"Dimensions of Spiral Wound Gaskets ASME B16.20 used with Raised Face flanges ASME B16.5," Explore the World of Piping, Werner Sölken, retrieved Jul. 5, 2016 from <URL: http://www.wermac.org/gaskets/dim_gaskets_sw.html>, 5 pages.

* cited by examiner

SYSTEMS FOR AND METHODS OF DIFFERENTIATING PIPE INSULATION

RELATED APPLICATIONS

This application is the U.S. national stage entry of PCT/US2017/052841, filed on Sep. 22, 2017, which claims priority to and all benefit of U.S. Provisional Patent Application Ser. No. 62/400,328, filed on Sep. 27, 2016 and titled SYSTEMS FOR AND METHODS OF DIFFERENTIATING PIPE INSULATION, the entire disclosures of which are fully incorporated herein by reference.

FIELD

The general inventive concepts relate generally to pipe insulation and, more particularly, to systems for and methods of differentiating pipe insulation.

BACKGROUND

Insulation is often applied around pipes and other cylindrical pipe-like members. As shown in FIGS. 1-3, pipe insulation 100 typically involves an insulating material 102 formed as an elongated cylindrical body 104. The insulating material 102 may be made from fiberglass. The insulating material 102 has a thickness t. The elongated cylindrical body 104 defines an inner cavity 106 having a diameter d. The inner cavity 106 is sized to fit around a pipe to be insulated. The insulating material 102 is often surrounded by a jacket 108 or similar outer covering. The jacket 108 may provide structural support for the insulating material 102. The jacket 108 may also act as a vapor barrier to protect the insulating material 102 from moisture.

To facilitate placement of the pipe insulation 100 around the pipe, a slit 110 is formed along a length of the elongated cylindrical body 104. The slit 110 extends through the insulating material 102 and, if necessary, the jacket 108. In some instances, a partial slit 112 is also formed along a length of the elongated cylindrical body 104, such as in a portion of the insulating material 102 opposite the slit 110. The partial slit 112 extends from the inner cavity 106 toward the jacket 108. The partial slit 112 does not extend through the entire thickness t of the insulating material 102 and, thus, does not reach the jacket 108. In this manner, the slit 110 and the partial slit 112 allow the elongated cylindrical body 104 to be fit around the pipe.

A size of the material forming the jacket 108 is greater than the circumference of the elongated cylindrical body 104, such that a flap 114 is formed. Once the pipe insulation 100 is situated around the pipe, the flap 114 extends over and seals the slit 110. The flap 114 may include an adhesive strip or other means of being fixed in place.

Because pipes come in many different sizes (e.g., diameters), pipe insulation also comes in many different sizes. For example, the diameter d of the inner cavity 106 of the pipe insulation 100 may vary depending on the size of pipe it is intended to insulate. Furthermore, the thickness t of the insulating material 102 in the pipe insulation 100 may vary depending on the desired properties of the pipe insulation 100. Furthermore, other differences may exist between pipe insulation products that otherwise have the same thickness t and diameter d. For example, the composition of the insulating material 102 in the pipe insulation 100 may differ for particular applications.

These variations in properties amongst different pipe insulation products may not always be readily apparent upon visual inspection. Thus, indicia 120 is sometimes provided on a pipe insulation product to provide information on one or more properties (e.g., size) of the pipe insulation product. In particular, indicia 120 in the form of alphanumeric characters may be printed on or otherwise affixed to the jacket 108 of the pipe insulation 100.

As shown in FIG. 2, the indicia 120 can be printed on the flap 114 of the jacket 108 along a side of the elongated cylindrical body 104 of the pipe insulation 100. In this case, the indicia 120 is oriented parallel to a lengthwise axis of the elongated cylindrical body 104. The indicia 120 could be printed on a portion of the jacket 108 below the flap 114, such that the flap 114 covers the indicia 120 after installation of the pipe insulation 100. As shown in FIG. 3, the indicia 120 can be printed on a portion of the jacket 108 near an end of the elongated cylindrical body 104 of the pipe insulation 100. In this case, the indicia 120 is oriented perpendicular to a lengthwise axis of the elongated cylindrical body 104.

Notwithstanding the provision of the indicia 120 on the conventional pipe insulation 100, it may still be difficult to quickly and easily identify variations in properties amongst different pipe insulation products through visual inspection. This is particularly true when the pipe insulation products are situated in a box or other container that completely or partially obscures the indicia. Thus, there is an unmet need for improved pipe insulation that is more readily distinguished from other pipe insulation, including improved systems for and methods of differentiating pipe insulation.

SUMMARY

The general inventive concepts contemplate pipe insulation that is more readily distinguished from other pipe insulation solely through visual inspection, as well as systems for and methods of differentiating pipe insulation.

In one exemplary embodiment, a pipe insulation product is disclosed. The pipe insulation product comprises a tubular core of insulating material having a length, a longitudinal axis, a cylindrical outer surface, and a cylindrical inner surface, wherein a thickness of the tubular core between the outer surface and the inner surface extends radially along the longitudinal axis from a first end of the tubular core to a second end of the tubular core opposite the first end. The pipe insulation product further comprises indicia situated between the outer surface and the inner surface on at least one end of the tubular core, the indicia providing information on at least one property of the pipe insulation product. The indicia allows a user to confirm that the at least one property of the pipe insulation product meets the user's requirements. The indicia also allows a user to differentiate the pipe insulation product from other pipe insulation products.

In one exemplary embodiment, the property is a diameter of a cavity defined by the inner surface of the tubular core. In one exemplary embodiment, the property is the thickness of the tubular core. In one exemplary embodiment, the property is the length of the tubular core. In one exemplary embodiment, the property is an R-value of the insulating material.

In one exemplary embodiment, the indicia comprises at least one of an alphanumeric character, a symbol, and a color.

In one exemplary embodiment, the pipe insulation product further comprises a jacket wrapped around a majority of the tubular core.

In one exemplary embodiment, the pipe insulation product further comprises a slit that extends the length of the tubular core from the outer surface to the inner surface.

In one exemplary embodiment, a system for differentiating pipe insulation products is disclosed. The system comprises a first pipe insulation member comprising a tubular core of insulating material having a length, a longitudinal axis, a cylindrical outer surface, and a cylindrical inner surface, wherein a thickness of the tubular core between the outer surface and the inner surface extends radially along the longitudinal axis from a first end of the tubular core to a second end of the tubular core opposite the first end; and a second pipe insulation member comprising a tubular core of insulating material having a length, a longitudinal axis, a cylindrical outer surface, and a cylindrical inner surface, wherein a thickness of the tubular core between the outer surface and the inner surface extends radially along the longitudinal axis from a first end of the tubular core to a second end of the tubular core opposite the first end. In the system, the first pipe insulation member includes first indicia situated between the outer surface and the inner surface on at least one end of the tubular core, the first indicia providing information on at least one property of the first pipe insulation member; and the second pipe insulation member includes second indicia situated between the outer surface and the inner surface on at least one end of the tubular core, the second indicia providing information on at least one property of the second pipe insulation member.

In one exemplary embodiment, the first indicia is the same as the second indicia when each of the at least one property of the first pipe insulation and the second pipe insulation are identical, and the first indicia differs from the second indicia when any one of the at least one property of the first pipe insulation differs from a corresponding one of the at least one property of the second pipe insulation.

In one exemplary embodiment, the first indicia and the second indicia allow a user to differentiate the first pipe insulation member from the second pipe insulation member when the first pipe insulation member and the second pipe insulation member are placed in a container, without requiring that the first pipe insulation member or the second pipe insulation member be moved relative to the container.

In one exemplary embodiment, a method of differentiating pipe insulation products is disclosed. The method comprises providing a first pipe insulation member comprising a tubular core of insulating material having a length, a longitudinal axis, a cylindrical outer surface, and a cylindrical inner surface, wherein a thickness of the tubular core between the outer surface and the inner surface extends radially along the longitudinal axis from a first end of the tubular core to a second end of the tubular core opposite the first end; and providing a second pipe insulation member comprising a tubular core of insulating material having a length, a longitudinal axis, a cylindrical outer surface, and a cylindrical inner surface, wherein a thickness of the tubular core between the outer surface and the inner surface extends radially along the longitudinal axis from a first end of the tubular core to a second end of the tubular core opposite the first end. The method further comprises applying first indicia between the outer surface and the inner surface on at least one end of the tubular core of the first pipe insulation member, the first indicia providing information on at least one property of the first pipe insulation member; and applying second indicia between the outer surface and the inner surface on at least one end of the tubular core of the second pipe insulation member, the second indicia providing information on at least one property of the second pipe insulation member.

In one exemplary embodiment, the first indicia is the same as the second indicia when each of the at least one property of the first pipe insulation and the second pipe insulation are identical, and the first indicia differs from the second indicia when any one of the at least one property of the first pipe insulation differs from the corresponding at least one property of the second pipe insulation.

In one exemplary embodiment, the first indicia and the second indicia allow a user to differentiate the first pipe insulation member from the second pipe insulation member when the first pipe insulation member and the second pipe insulation member are placed in a container, without requiring that the first pipe insulation member or the second pipe insulation member be moved relative to the container.

Other aspects, advantages, and features of the general inventive concepts will become apparent to those skilled in the art from the following detailed description, when read in light of the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which:

FIG. 1 is a top plan view of the conventional pipe insulation. FIG. 2 is a perspective side view of the conventional pipe insulation. FIG. 3 is a side view of the conventional pipe insulation oriented in an upright direction.

FIG. 6A is a top plan view of pipe insulation, according to one exemplary embodiment. FIG. 6B is a top plan view of pipe insulation, according to one exemplary embodiment.

FIG. 7A is a top plan view of pipe insulation, according to one exemplary embodiment. FIG. 7B is a top plan view of pipe insulation, according to one exemplary embodiment.

DETAILED DESCRIPTION

Figure 1:
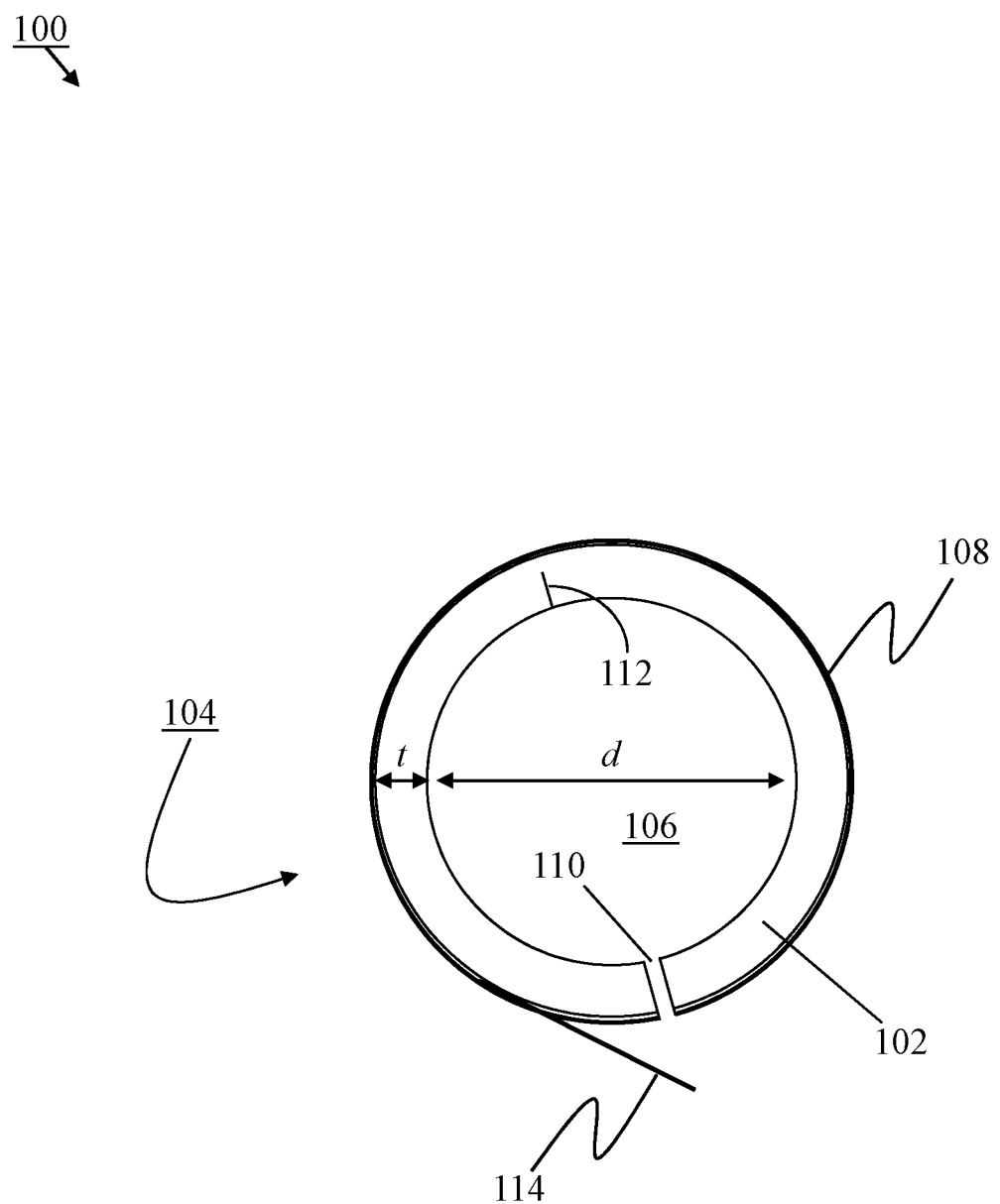
FIGS. 1-3 illustrate conventional pipe insulation.
Figure 2:
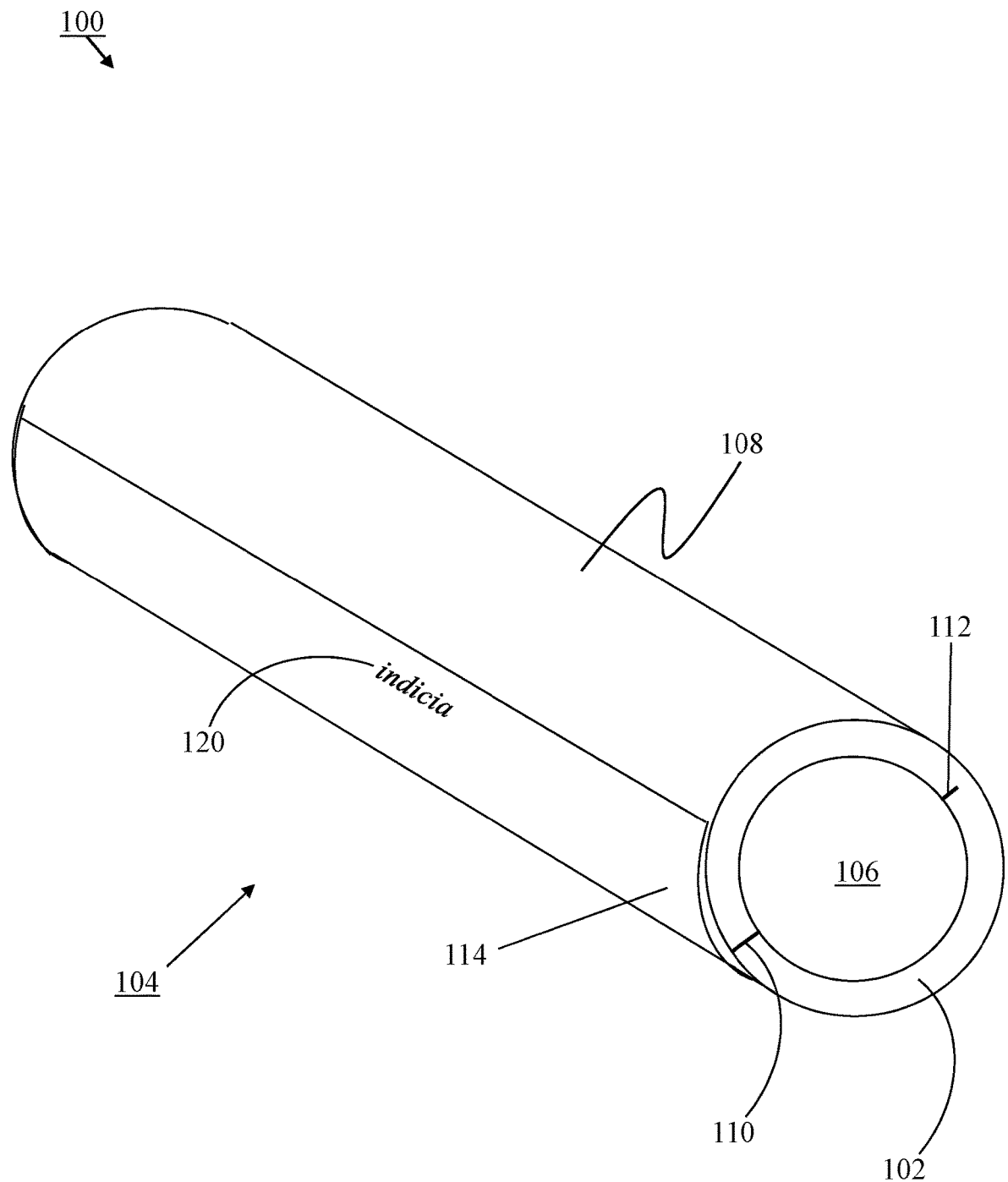
Figure 3:
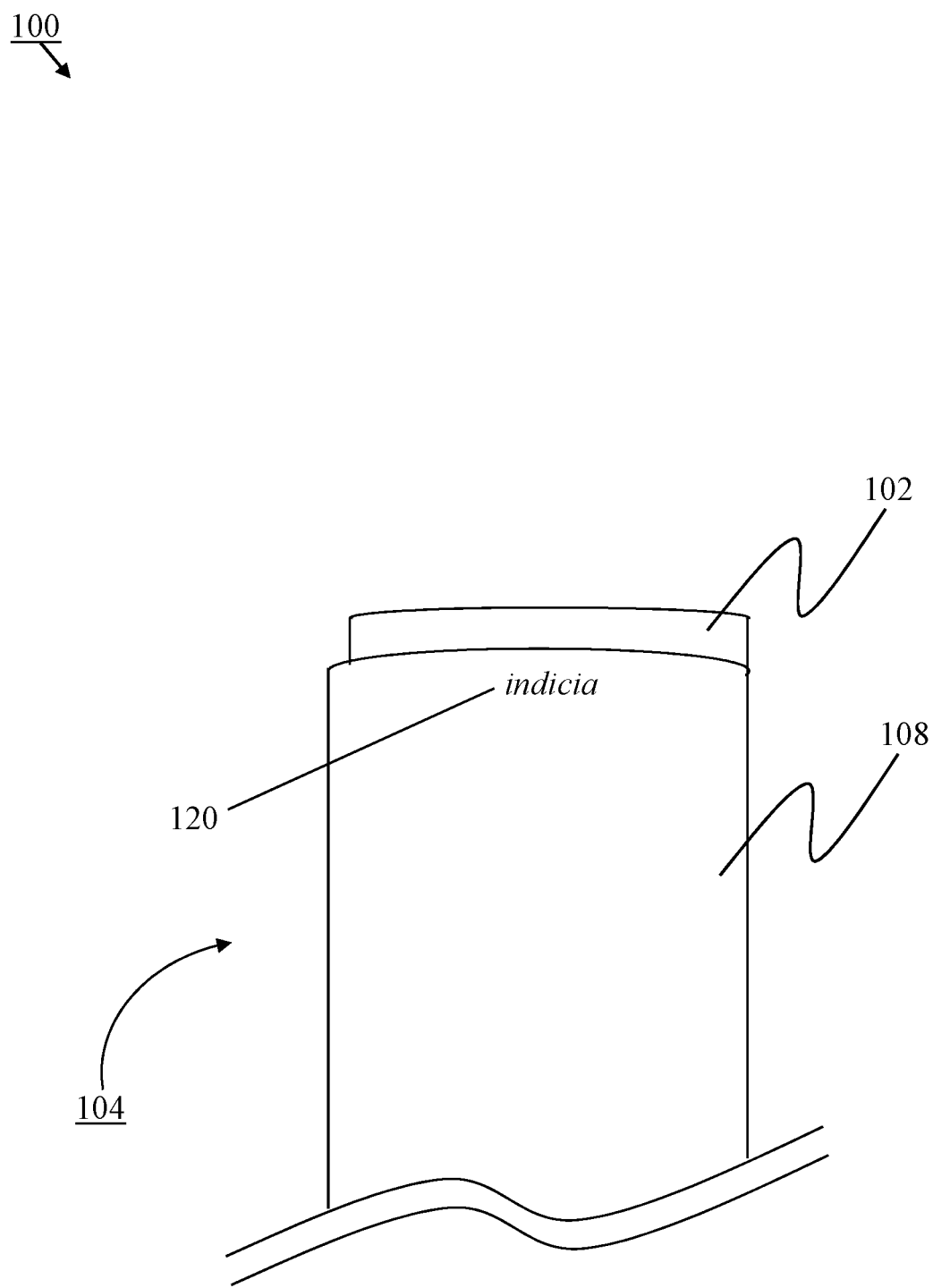

While the general inventive concepts are susceptible of embodiment in many different forms, there are shown in the drawings and will be described herein in detail specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, the terms used herein have the same meaning as commonly understood by one of ordinary skill in the art encompassing the general inventive concepts. The terminology used herein is for describing exemplary embodiments of the general inventive concepts only and is not intended to be limiting of the general inventive concepts. As used in the description of the general inventive concepts and the appended claims, the singular forms "a," "an," and "the" are intended to include the plural forms as well, unless the context clearly indicates otherwise.

The general inventive concepts contemplate pipe insulation that is more readily distinguished from other pipe insulation solely through visual inspection, as well as systems for and methods of differentiating pipe insulation.

Figure 4:
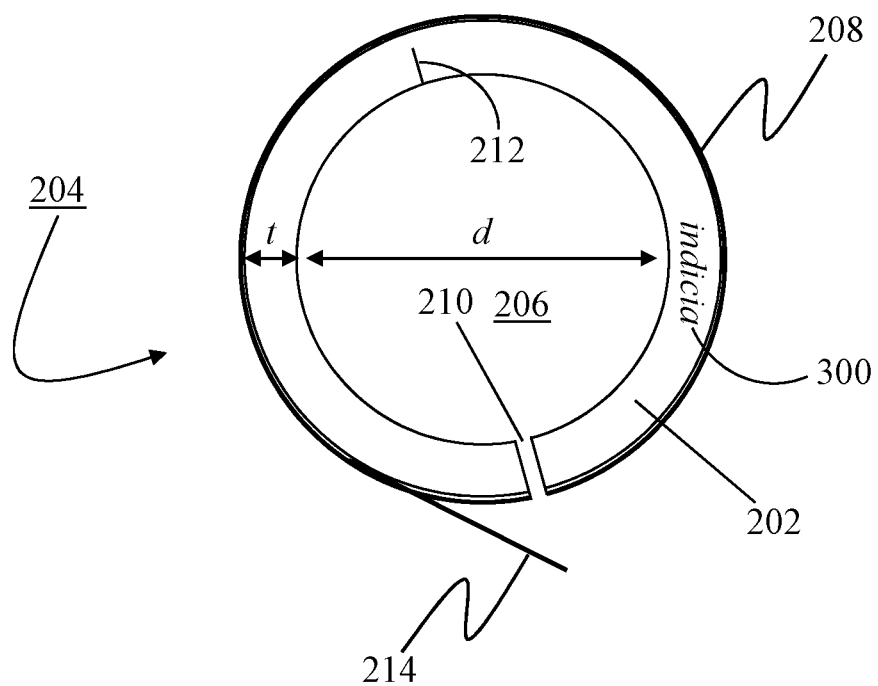
FIG. 4 is a top plan view of pipe insulation encompassed by the general inventive concepts, according to an exemplary embodiment.

Referring now to the drawings, there is illustrated in FIG. 4 pipe insulation 200 that is sized and shaped so as to be suitable for placement around pipes and/or other cylindrical pipe-like members having a similar size and shape. The pipe insulation 200 comprises an insulating material 202 formed as an elongated cylindrical body 204. A length of the elongated cylindrical body 204 can vary, for example, from 1 inch to 72 inches. In some exemplary embodiments, a length of the elongated cylindrical body 204 is approximately 36 inches, +/−1 inch. The insulating material 202 may be made from any suitable insulation. In some exemplary embodiments, the insulating material 202 comprises fiberglass. In some exemplary embodiments, the insulating material 202 comprises a combination of two or more different insulations. In some exemplary embodiments, the insulating material 202 has an R-value from 2.2 to 43.1.

The insulating material 202 has a thickness t. The elongated cylindrical body 204 defines an inner cavity 206 having a diameter d. The inner cavity 206 is sized to fit around a pipe to be insulated. The insulating material 202 is often surrounded by a jacket 208 or similar outer covering. The jacket 208 may provide structural support for the insulating material 202. The jacket 208 may also act as a vapor barrier to protect the insulating material 202 from moisture.

To facilitate placement of the pipe insulation 200 around the pipe, a slit 210 is formed along a length of the elongated cylindrical body 204. The slit 210 extends through the insulating material 202. Either the jacket 208 does not cover the slit 210 or, alternatively, the slit 210 extends through the jacket 208. In some instances, a partial slit 212 is also formed along a length of the elongated cylindrical body 204, such as in a portion of the insulating material 202 opposite the slit 210. In some exemplary embodiments, a plurality of partial slits 212, which are spaced apart from one another, are formed in the insulating material 202. Each partial slit 212 extends from the inner cavity 206 toward the jacket 208. The partial slit 212 does not extend through the entire thickness t of the insulating material 202 and, thus, does not reach the jacket 208. In this manner, the slit 210 and the one or more partial slits 212 allow the elongated cylindrical body 204 to be fit around the pipe.

A size of the material forming the jacket 208 is typically greater than the circumference (e.g., $\pi*(d+t+t)$) of the elongated cylindrical body 204, such that a flap 214 is formed. Once the pipe insulation 200 is situated around the pipe, the flap 214 extends over and seals the slit 210. The flap 214 may include an adhesive strip or other means of being fixed in place. In this manner, the jacket 208 forms an uninterrupted covering around an outer periphery of most, if not all, of the insulating material 202.

Pipe insulation comes in many different sizes. The size of the pipe insulation 200 may be designated, for example, based on the diameter d of the inner cavity 206 of the pipe insulation 200. This value d lets a user (e.g., an installer) know that the pipe insulation 200 should be able to accommodate a pipe that has a diameter equal to (or substantially equal to) d within its inner cavity 206. In some exemplary embodiments, the diameter d ranges from ½ inches to 42 inches. In some exemplary embodiments, the diameter d ranges from 1.89 inches to 33 inches.

Furthermore, the thickness t of the insulating material 202 in the pipe insulation 200 may vary depending on the desired properties of the pipe insulation 200. For example, an insulating capacity of the insulating material 202 will generally increase as the value of t increases. In some exemplary embodiments, the thickness t ranges from ½ inches to 5 inches.

Furthermore, other differences may exist between pipe insulation products that otherwise have the same thickness t and diameter d. For example, the composition of the insulating material 202 in the pipe insulation 200 may differ for a particular application. In some exemplary embodiments, the pipe insulation 200 has an R-value from 2.2 to 43.1.

These variations in dimensions and/or properties amongst different pipe insulation products may not always be readily apparent upon visual inspection. Thus, the general inventive concepts contemplate the use of indicia 300 on the pipe insulation 200. The indicia 300 provides information on one or more characteristics of the pipe insulation 200. For example, the indicia 300 can provide information on one or more characteristics (e.g., R-value) of the insulating material 202. As another example, the indicia 300 can provide information on one or more characteristics (e.g., permeance) of the jacket 208.

Figure 5A:
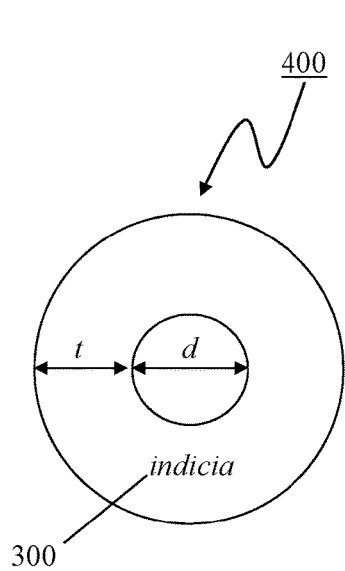
FIGS. 5A-5C illustrate pipe insulation encompassed by the general inventive concepts, wherein the pipe insulation exhibits varying physical dimensions.
Figure 5B:
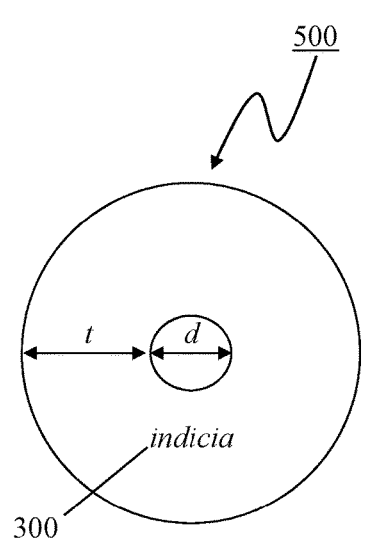
Figure 5C:
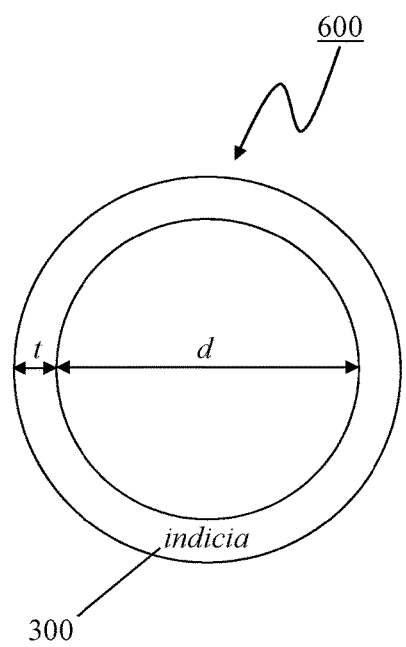

In some exemplary embodiments, the indicia 300 is provided on at least one end of the pipe insulation 200, as shown in FIG. 4. In this case, the indicia 300 is provided within the thickness t of the insulating material 202 of the pipe insulation 200. As shown in FIGS. 5A-5C, the general inventive concepts are applicable to all sizes of pipe insulation, including pipe insulation 400 having a thickness t equal to (or substantially equal to) its diameter d, including pipe insulation 500 having a thickness t larger than its diameter d, and including pipe insulation 600 having a thickness t smaller than its diameter d.

In some exemplary embodiments, the indicia is not applied to the jacket 208, as is done with conventional pipe insulation. Instead, the indicia 300 is applied directly to the insulating material 202 of the pipe insulation 200. For example, the indicia 300 can be printed on, stamped on, painted on, coated on, or otherwise formed on the insulating material 202.

In some exemplary embodiments, the indicia 300 comprises alphanumeric characters that are printed directly on the insulating material 202 on an end of the pipe insulation 200, such that the indicia 300 can be readily identified solely by visual inspection of the end of the pipe insulation 200. In some exemplary embodiments, the indicia 300 comprises non-alphanumeric information (e.g., colors, patterns, symbols) that is printed directly on the insulating material 202 on an end of the pipe insulation 200, such that the indicia 300 can be readily identified solely by visual inspection of the end of the pipe insulation 200. In other words, the indicia 300 can be seen and processed by a user even when most or all of the side of the pipe insulation 200 cannot be viewed.

Figure 6A:
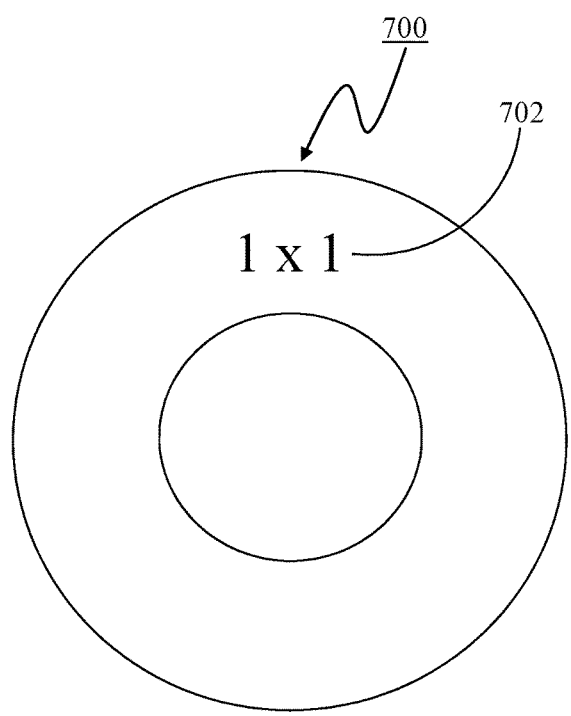
FIGS. 6A-6B illustrate pipe insulation encompassed by the general inventive concepts.
Figure 6B:
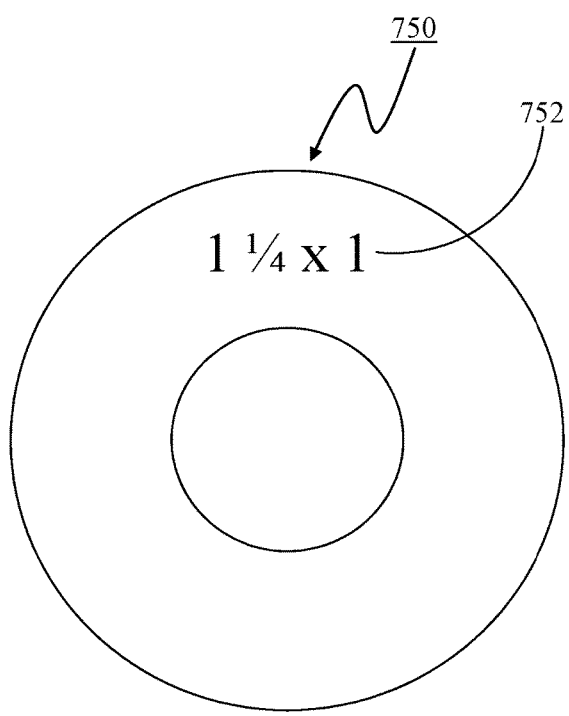

The indicia 300 can be used to convey any information on the pipe insulation 200 including, for example, its size (e.g., thickness t, diameter d, length) and/or R-value. As shown in FIG. 6A, a first pipe insulation 700 includes indicia 702 indicating that the first pipe insulation 700 has a thickness of 1 inch and a diameter of 1 inch. As shown in FIG. 6B, a second pipe insulation 750 includes indicia 752 indicating that the second pipe insulation 750 has at thickness of 1¼ inches and a diameter of 1 inch. Thus, in accordance with the general inventive concepts, the indicia 702, 752 allow for easy and accurate differentiation between the first pipe insulation 700 and the second pipe insulation 750.

Figure 7A:
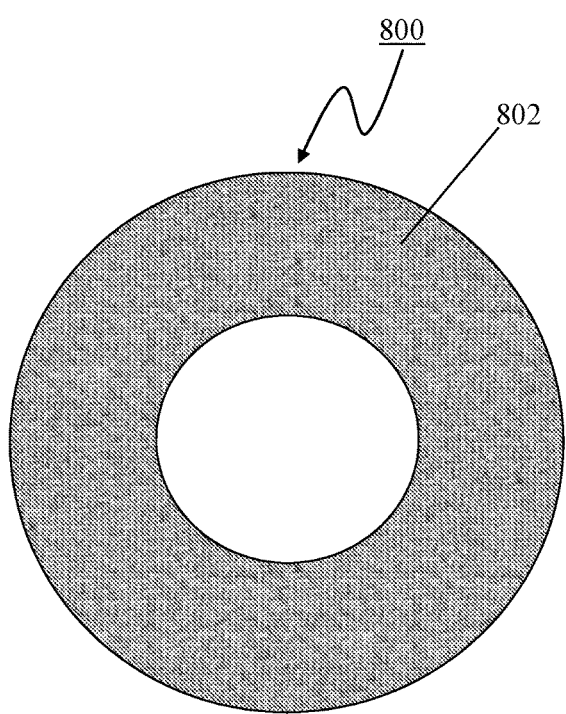
FIGS. 7A-7B illustrate pipe insulation encompassed by the general inventive concepts.
Figure 7B:
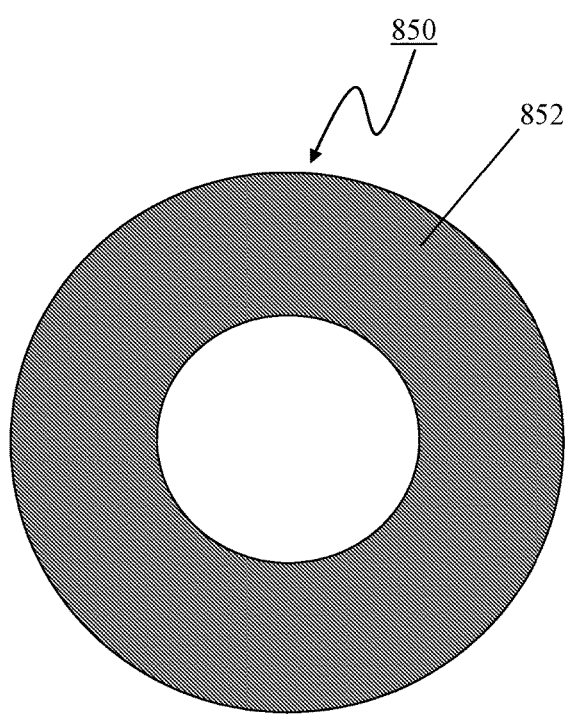
Figure 8:
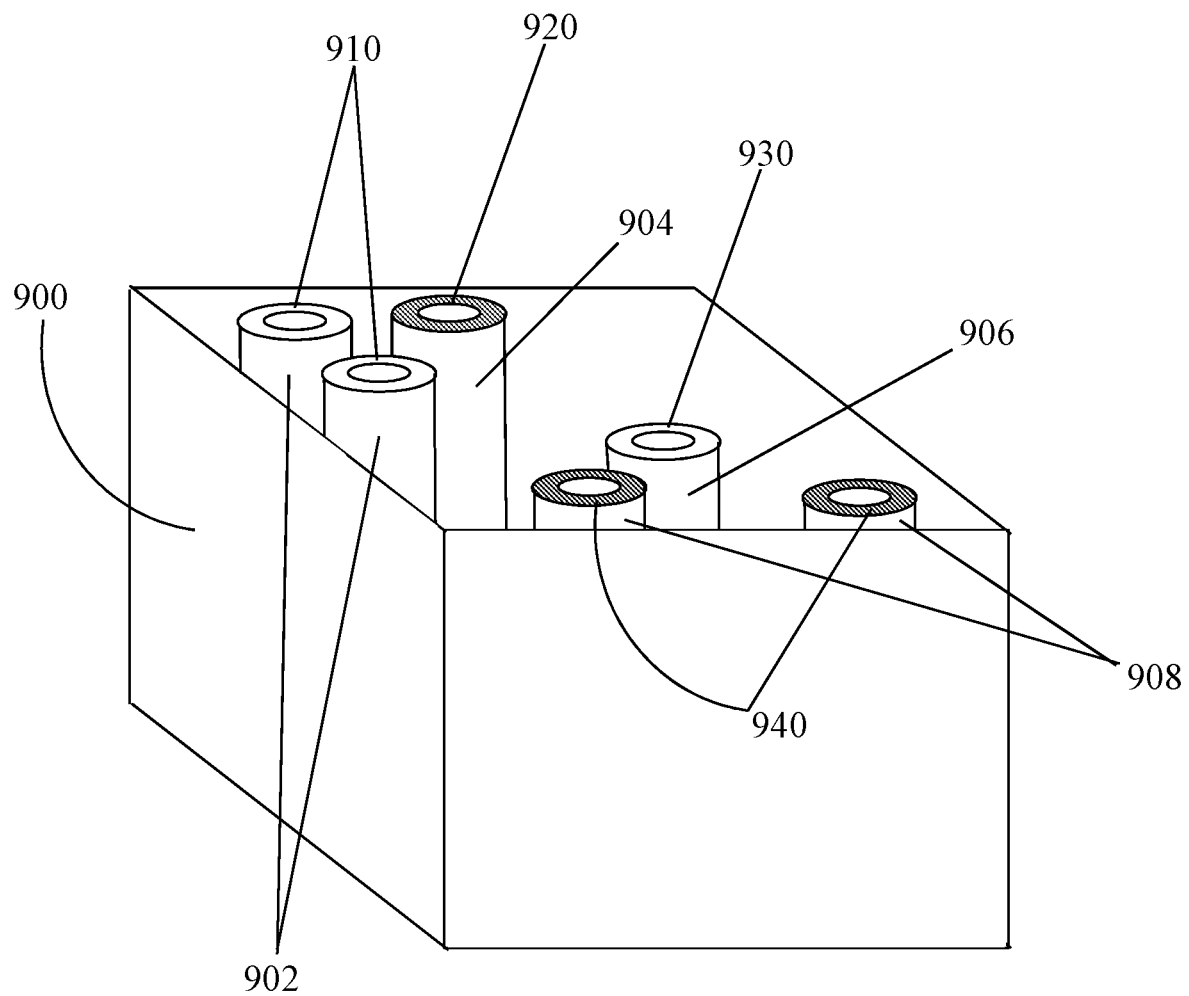
FIG. 8 is a drawing of an exemplary container in which several distinct pipe insulation members encompassed by the general inventive concepts are situated.

As shown in FIG. 7A, a first pipe insulation 800 includes indicia 802 in the form of a first color, wherein the first color is associated with a given property (e.g., R-value) for the first pipe insulation 800. As shown in FIG. 7B, a second pipe insulation 850 includes indicia 852 in the form of a second color, wherein the second color is associated with a given property (e.g., R-value) for the second pipe insulation 850. Thus, in accordance with the general inventive concepts, the indicia 802, 852 allow for easy and accurate differentiation between the first pipe insulation 800 and the second pipe insulation 850.

As noted above, the indicia 300 can be seen and processed by a user even when only the top or uppermost portion of the pipe insulation 200 is visible (i.e., even when most or all of the bottom and side of the pipe insulation 200 cannot be viewed). As shown in FIG. 9, a container 900 (e.g., a box) holds a plurality of pipe insulation bodies, each of which has a general construction similar to the pipe insulation 200. A pair of first pipe insulation bodies 902 have at least one property (e.g., size, R-value) that is different from the other pipe insulation bodies in the container 900. A second pipe insulation body 904 has at least one property (e.g., size, R-value) that is different from the other pipe insulation bodies in the container 900. A third pipe insulation body 906 has at least one property (e.g., size, R-value) that is different from the other pipe insulation bodies in the container 900. A pair of fourth pipe insulation bodies 908 have at least one property (e.g., size, R-value) that is different from the other pipe insulation bodies in the container 900. The first pipe insulation bodies 902 include indicia 910 thereon. The second pipe insulation body 904 includes indicia 920 thereon. The third pipe insulation body 906 includes indicia 930 thereon. The fourth pipe insulation bodies 908 include indicia 940 thereon. The indicia 910, 920, 930, and 940 allow the respective pipe insulation bodies 902, 904, 906, and 908 to be readily differentiated from one another. In other words, a user can readily view the indicia of each pipe insulation body in the container 900 and, without having to remove or otherwise manipulate any of the pipe insulation bodies, determine a specific one of the pipe insulation bodies (from amongst all of the pipe insulation bodies in the container 900) that has the property or properties desired by the user.

In addition to the various exemplary embodiments of the pipe insulation, as described herein, the general inventive concepts also encompass systems for and methods of differentiating pipe insulation.

In one exemplary embodiment, a system for differentiating pipe insulation comprises providing a plurality of different pipe insulation bodies, members, products, or the like, wherein at least one first pipe insulation body and at least one second pipe insulation body have a common property (e.g., size, R-value), and wherein a value of the property differs between the first pipe insulation body and the second pipe insulation body. According to the system, each of the provided pipe insulation bodies includes indicia (typically printed directly on an exposed thickness of the insulating material at an end of the pipe insulation body). The indicia can take any form suitable for conveying information on the particular value of the common property for the specific pipe insulation body having the indicia. By way of example, the indicia could include one or more of alphanumeric characters, colors, patterns, and symbols.

In some exemplary embodiments, the common property of the first pipe insulation body and the second pipe insulation body does not relate to the insulating material. For example, the common property could be a property of the jacket. In some instances, the property (e.g., permeance) of the jacket cannot be accurately determined even upon visual inspection of the jacket. Thus, the indicia can be used to readily convey differences in the properties of the jackets between the first and second pipe insulation bodies.

In one exemplary embodiment, the system could further include a package that contains a plurality of pipe insulation bodies, each of the pipe insulation bodies having indicia thereon. In one exemplary embodiment, the package includes information (e.g., in the form of a legend, summary, or the like) that explains the meaning of the indicia for the benefit of a user of the pipe insulation bodies. By way of example, the information could be printed on the outside of the package or included as an insert in the package itself.

In one exemplary embodiment, a method of differentiating pipe insulation comprises forming or otherwise providing a plurality of different pipe insulation bodies, members, products, or the like, wherein at least one first pipe insulation body and at least one second pipe insulation body have a common property (e.g., size, R-value), and wherein a value of the property differs between the first pipe insulation body and the second pipe insulation body. According to the method, each of the provided pipe insulation bodies includes indicia. In one exemplary embodiment, the method comprises printing the indicia directly on an exposed thickness of the insulating material at an end of the pipe insulation body. In one exemplary embodiment, the method comprises coloring (e.g., painting, coating, dipping) at least a portion of the end of the pipe insulation body. Notwithstanding these examples, the indicia can take any form suitable for conveying information on the particular value of the common property for the specific pipe insulation body having the indicia.

In some exemplary embodiments, the common property of the first pipe insulation body and the second pipe insulation body does not relate to the insulating material. For example, the common property could be a property of the jacket. In some instances, the property (e.g., permeance) of the jacket cannot be accurately determined even upon visual inspection of the jacket. Thus, the indicia can be used to readily convey differences in the properties of the jackets between the first and second pipe insulation bodies.

In one exemplary embodiment, the method could further comprise packaging a plurality of pipe insulation bodies, each of the pipe insulation bodies having indicia thereon, together, such as in a container (e.g., box) or by shrinkwrap. In one exemplary embodiment, the packaging includes information (e.g., in the form of a legend, summary, or the like) that explains the meaning of the indicia for the benefit of a user of the pipe insulation bodies. By way of example, the information could be printed on the outside of the packaging or included as an insert therein.

The above description of specific embodiments has been given by way of example. From the disclosure given, those skilled in the art will not only understand the general inventive concepts and their attendant advantages, but will also find apparent various changes and modifications to the structures and concepts disclosed. It is sought, therefore, to cover all such changes and modifications as fall within the spirit and scope of the general inventive concepts, as defined herein and by the appended claims, and equivalents thereof.

What is claimed is:

1. A pipe insulation product comprising:
   a tubular core of insulating material having a length, a longitudinal axis, a cylindrical outer surface, and a cylindrical inner surface, wherein a thickness of the tubular core between the outer surface and the inner surface extends radially along the longitudinal axis from a first end of the tubular core to a second end of the tubular core opposite the first end;
   a jacket wrapped around a majority of the tubular core;
   first indicia situated between the outer surface and the inner surface on at least one end of the tubular core, the first indicia providing information on a first property of the tubular core of the pipe insulation product; and
   second indicia situated between the outer surface and the inner surface on at least one end of the tubular core, the second indicia providing information on a second property of the jacket of the pipe insulation product.

2. The pipe insulation product of claim 1, wherein the first property is a diameter of a cavity defined by the inner surface of the tubular core.

3. The pipe insulation product of claim 1, wherein the first property is the thickness of the tubular core.

4. The pipe insulation product of claim 1, wherein the first property is the length of the tubular core.

5. The pipe insulation product of claim 1, wherein the first property is an R-value of the insulating material.

6. The pipe insulation product of claim 1, wherein the first indicia comprises at least one of an alphanumeric character, a symbol, and a color; and
   wherein the second indicia comprises at least one of an alphanumeric character, a symbol, and a color.

7. The pipe insulation product of claim 1, further comprising a slit that extends the length of the tubular core from the outer surface to the inner surface.

8. A system for differentiating pipe insulation products, the system comprising:
   a first pipe insulation member comprising a tubular core of insulating material having a length, a longitudinal axis, a cylindrical outer surface, and a cylindrical inner surface, and a jacket wrapped around a majority of the tubular core, wherein a thickness of the tubular core between the outer surface and the inner surface extends radially along the longitudinal axis from a first end of the tubular core to a second end of the tubular core opposite the first end; and
   a second pipe insulation member comprising a tubular core of insulating material having a length, a longitudinal axis, a cylindrical outer surface, and a cylindrical inner surface, and a jacket wrapped around a majority of the tubular core, wherein a thickness of the tubular core between the outer surface and the inner surface extends radially along the longitudinal axis from a first end of the tubular core to a second end of the tubular core opposite the first end;
   wherein the first pipe insulation member includes first indicia situated between the outer surface and the inner surface on at least one end of the tubular core, the first indicia providing information on a first property of the tubular core of the first pipe insulation member;
   wherein the first pipe insulation member includes second indicia situated between the outer surface and the inner surface on at least one end of the tubular core, the second indicia providing information on a second property of the jacket of the first pipe insulation member;
   wherein the second pipe insulation member includes third indicia situated between the outer surface and the inner surface on at least one end of the tubular core, the third indicia providing information on a third property of the tubular core of the second pipe insulation member; and
   wherein the second pipe insulation member includes fourth indicia situated between the outer surface and the inner surface on at least one end of the tubular core, the fourth indicia providing information on a fourth property of the jacket of the second pipe insulation member.

9. The system of claim 8, wherein the first indicia is the same as the third indicia when each of the first property of the first pipe insulation and the third property of the second pipe insulation are identical,
   wherein the first indicia differs from the third indicia when the first property of the first pipe insulation differs from the third property of the second pipe insulation,
   wherein the second indicia is the same as the fourth indicia when the second property of the first pipe insulation and the fourth property of the second pipe insulation are identical, and
   wherein the second indicia differs from the fourth indicia when the second property of the first pipe insulation differs from the fourth property of the second pipe insulation.

10. The system of claim 8, wherein the first indicia, the second indicia, the third indicia, and the fourth indicia allow a user to differentiate the first pipe insulation member from the second pipe insulation member when the first pipe insulation member and the second pipe insulation member are placed in a container, without requiring that the first pipe insulation member or the second pipe insulation member be moved relative to the container.

11. A method of differentiating pipe insulation products, the method comprising:
   providing a first pipe insulation member comprising a tubular core of insulating material having a length, a longitudinal axis, a cylindrical outer surface, and a cylindrical inner surface, and a jacket wrapped around a majority of the tubular core, wherein a thickness of the tubular core between the outer surface and the inner surface extends radially along the longitudinal axis from a first end of the tubular core to a second end of the tubular core opposite the first end;
   providing a second pipe insulation member comprising a tubular core of insulating material having a length, a longitudinal axis, a cylindrical outer surface, and a cylindrical inner surface, and a jacket wrapped around a majority of the tubular core, wherein a thickness of the tubular core between the outer surface and the inner surface extends radially along the longitudinal axis from a first end of the tubular core to a second end of the tubular core opposite the first end;
   applying first indicia between the outer surface and the inner surface on at least one end of the tubular core of the first pipe insulation member, the first indicia providing information on a first property of the tubular core of the first pipe insulation member;
   applying second indicia between the outer surface and the inner surface on at least one end of the tubular core of the first pipe insulation member, the second indicia providing information on a second property of the jacket of the first pipe insulation member;
   applying third indicia between the outer surface and the inner surface on at least one end of the tubular core of the second pipe insulation member, the third indicia providing information on a third property of the tubular core of the second pipe insulation member; and applying fourth indicia between the outer surface and the inner surface on at least one end of the tubular core of the second pipe insulation member, the fourth indicia providing information on a fourth property of the jacket of the second pipe insulation member.

12. The method of claim 11, wherein the first indicia is the same as the third indicia when each of the first property of the first pipe insulation and the third property of the second pipe insulation are identical,
   wherein the first indicia differs from the third indicia when the first property of the first pipe insulation differs from the third property of the second pipe insulation,
   wherein the second indicia is the same as the fourth indicia when the second property of the first pipe insulation and the fourth property of the second pipe insulation are identical, and
   wherein the second indicia differs from the fourth indicia when the second property of the first pipe insulation differs from the fourth property of the second pipe insulation.

13. The method of claim 11, wherein the first indicia, the second indicia, the third indicia, and the fourth indicia allow a user to differentiate the first pipe insulation member from the second pipe insulation member when the first pipe insulation member and the second pipe insulation member are placed in a container, without requiring that the first pipe insulation member or the second pipe insulation member be moved relative to the container.

* * * * *